United States Patent
Schwimer

(10) Patent No.: US 8,171,161 B2
(45) Date of Patent: May 1, 2012

(54) STATIC AND DYNAMIC CONTENT DELIVERY

(75) Inventor: Greg Schwimer, Cave Creek, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 13/290,870

(22) Filed: Nov. 7, 2011

(65) Prior Publication Data

US 2012/0054274 A1 Mar. 1, 2012

Related U.S. Application Data

(63) Continuation of application No. 12/495,629, filed on Jun. 30, 2009, now Pat. No. 8,078,757.

(51) Int. Cl.
*G06F 15/173* (2006.01)
(52) U.S. Cl. ........ 709/241; 709/201; 709/202; 709/203; 709/238
(58) Field of Classification Search .......... 709/201–203, 709/238, 241
See application file for complete search history.

(56) References Cited

U.S. PATENT DOCUMENTS

| | | | |
|---|---|---|---|
| 5,793,972 A | 8/1998 | Shane | |
| 5,838,790 A | 11/1998 | McAuliffe et al. | |
| 5,857,175 A | 1/1999 | Day et al. | |
| 5,887,133 A | 3/1999 | Brown et al. | |
| 5,937,037 A | 8/1999 | Kamel et al. | |
| 6,009,409 A | 12/1999 | Adler et al. | |
| 6,009,410 A | 12/1999 | LeMole et al. | |
| 6,014,638 A | 1/2000 | Burge et al. | |
| 6,085,229 A | 7/2000 | Newman et al. | |
| 6,256,633 B1 | 7/2001 | Dharap | |
| 6,263,352 B1 | 7/2001 | Cohen | |
| 6,286,045 B1 | 9/2001 | Griffiths et al. | |
| 6,330,605 B1 | 12/2001 | Christensen et al. | |
| 6,385,592 B1 | 5/2002 | Angles et al. | |
| 6,401,094 B1 | 6/2002 | Stemp et al. | |
| 6,442,529 B1 | 8/2002 | Krishan et al. | |
| 6,496,857 B1 | 12/2002 | Dustin et al. | |
| 6,513,052 B1 | 1/2003 | Binder | |
| 6,601,041 B1 | 7/2003 | Brown et al. | |
| 6,606,652 B1 | 8/2003 | Cohn et al. | |
| 6,615,247 B1 | 9/2003 | Murphy | |
| 6,973,505 B1 | 12/2005 | Schneider | |
| 7,111,229 B2 | 9/2006 | Nicholas et al. | |
| 7,565,450 B2 * | 7/2009 | Garcia-Luna-Aceves et al. | 709/245 |
| 7,647,387 B2 * | 1/2010 | Bellare et al. | 709/218 |
| 2002/0007413 A1 * | 1/2002 | Garcia-Luna-Aceves et al. | 709/229 |
| 2002/0169890 A1 * | 11/2002 | Beaumont et al. | 709/245 |
| 2003/0200307 A1 * | 10/2003 | Raju et al. | 709/224 |
| 2004/0059708 A1 | 3/2004 | Dean et al. | |

(Continued)

OTHER PUBLICATIONS

Dec. 13, 2010 Non-Final Rejection, U.S. Appl. No. 12/495,603 (Publication US 2010-0332587 A1).

(Continued)

*Primary Examiner* — Mohamed Wasel
(74) *Attorney, Agent, or Firm* — Chris A. Watt; Karl A. Fazio

(57) ABSTRACT

Systems and methods of the present invention provide for returning website content after being requested by a client. A dynamic component and a rewritten URL may be requested and a static component may be requested, which may be updated. The combination of static and dynamic website content may be returned to the client.

28 Claims, 11 Drawing Sheets

U.S. PATENT DOCUMENTS

2004/0249978 A1 12/2004 Marappan et al.
2005/0021397 A1 1/2005 Cui et al.

OTHER PUBLICATIONS

Jan. 24, 2011 Response to Dec. 13, 2010 Non-Final Rejection, U.S. Appl. No. 12/495,603 (Publication US 2010-0332587 A1).
Dec. 17, 2010 Non-Final Rejection, U.S. Appl. No. 12/495,629 (Publication US 2010-0332588 A1).
Jan. 24, 2011 Response to Dec. 17, 2010 Non-Final Rejection, U.S. Appl. No. 12/495,629 (Publication US 2010-0332588 A1).
Dec. 13, 2010 Non-Final Rejection, U.S. Appl. No. 12/495,652 (Publication US 2010-0332589 A1).
Jan. 24, 2011 Response to Dec. 13, 2010 Non-Final Rejection, U.S. Appl. No. 12/495,652 (Publication US 2010-0332589 A1).
Mar. 28, 2011 Final Rejection, U.S. Appl. No. 12/495,629 (Publication US 2010-0332588 A1).
Jun. 3, 2011 Appeal of Mar. 28, 2011 Final Rejection, U.S. Appl. No. 12/495,629 (Publication US 2010-0332588 A1).
Mar. 25, 2011 Final Rejection, U.S. Appl. No. 12/495,652 (Publication US 2010-0332589 A1).
Jun. 3, 2011 Appeal of Mar. 25, 2011 Final Rejection, U.S. Appl. No. 12/495,652 (Publication US 2010-0332589 A1).
Sep. 2, 2011 Notice of Allowance, U.S. Appl. No. 12/495,603 (Publication US 2010-0332587 A1).
Sep. 9, 2011 Notice of Allowance, U.S. Appl. No. 12/495,629 (Publication US 2010-0332588 A1).
Aug. 22, 2011 Notice of Allowance, U.S. Appl. No. 12/495,652 (Publication US 2010-0332589 A1).

* cited by examiner

STATIC AND DYNAMIC CONTENT DELIVERY

CROSS REFERENCE TO RELATED PATENT APPLICATIONS

This continuation application claims the benefit of U.S. patent application Ser. No. 12/495,629 filed on Jun. 30, 2009.

This patent application is related to the following concurrently-filed patent applications:

U.S. patent application Ser. No. 12/495,603, "IN-LINE STATIC AND DYNAMIC CONTENT DELIVERY."

U.S. patent application Ser. No. 12/495,629, "REWRITTEN URL STATIC AND DYNAMIC CONTENT DELIVERY."

U.S. patent application Ser. No. 12/495,652, "INTEGRATED STATIC AND DYNAMIC CONTENT DELIVERY."

The subject matter of all patent applications is commonly owned and assigned to The Go Daddy Group, Inc. All prior applications are incorporated herein in their entirety by reference

FIELD OF THE INVENTION

The present inventions generally relate to the field of networking and specifically to the field of static and dynamic content delivery.

SUMMARY OF THE INVENTION

The present invention provides methods and systems for delivery of static and dynamic content. An exemplary method may comprise several steps including the step of receiving a request for website content from a client. A network routing server computer may identify a data center 380 closest to the client. A static component of the requested website content may be located within a cache server or component within the data center 380. A dynamic component may also be requested from a shared hosting server in the data center 380 as well as an update to the static component and/or a rewritten URL. The website content may then be returned to the client.

The above features and advantages of the present invention will be better understood from the following detailed description taken in conjunction with the accompanying drawings.

DETAILED DESCRIPTION

Figure 1:
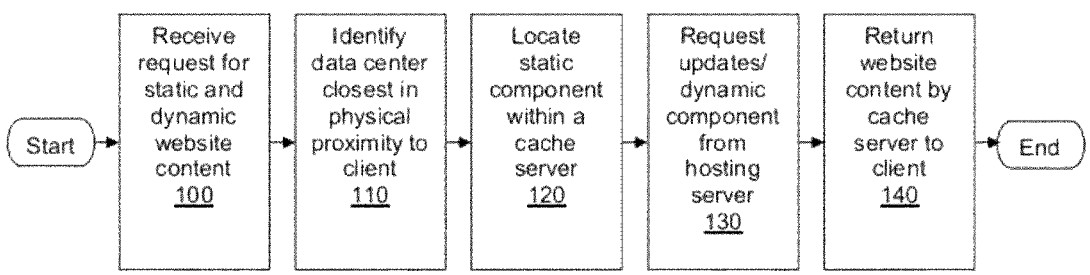
FIG. 1 is a flow diagram illustrating a possible embodiment of a method for delivering static and dynamic content.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

A Method of in-Line Static and Dynamic Content Delivery

Several different methods may be used to provide and manage the disclosed invention. In an example embodiment illustrated in FIG. 1, a request may be received, from a client, for a website content including a static component and a dynamic component (Step 100), and a data center 380 may be identified as being closest in physical proximity to the client as compared to a plurality of data centers communicatively coupled to a network (Step 110). The static component of the website content may be located within a cache server in the data center 380 (Step 120), and the cache server may request updates to the static component, the dynamic component of the website content and/or security related certificates (such as Secure Socket Layer (SSL) certificates) from a shared hosting server within the data center 380 (Step 130). When the website content, including the static and dynamic components are combined and/or assembled, the website content may be returned to the client by the cache server (Step 140).

Figure 2:
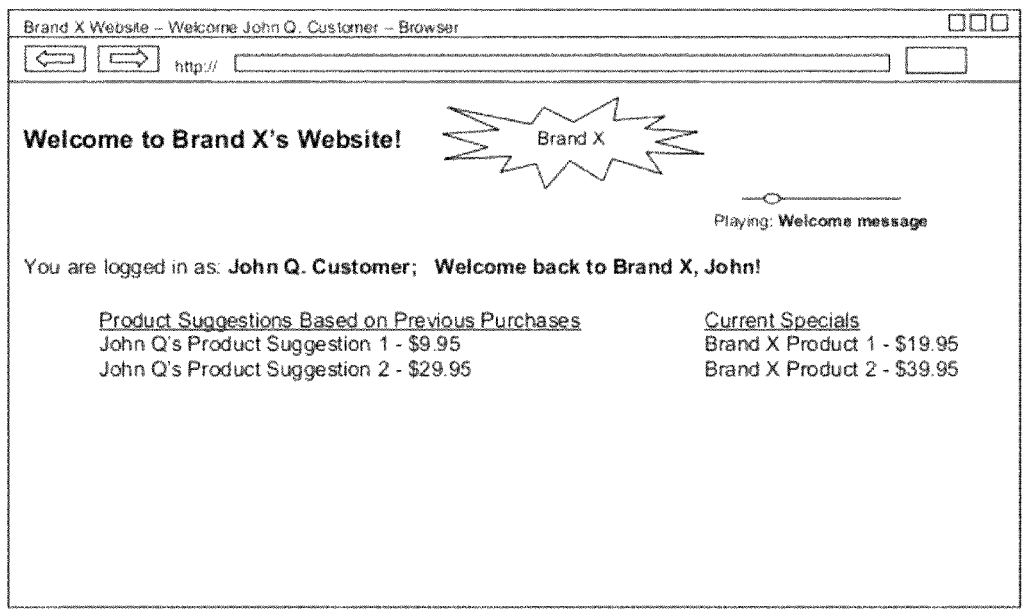
FIG. 2 illustrates a possible embodiment of an interface including delivered static and dynamic content.

FIG. 2 shows an example user interface for an ecommerce site. This ecommerce site for a fictitious company, Brand X, may be displayed as shown on a client browser using the structure disclosed herein, and may be used in disclosed embodiments to demonstrate static and dynamic content elements which may make up the static and dynamic components of the website content respectively.

Static content may include website content that always comprises the same information in response to all download requests from all users. Examples of static content displayed on the interface in FIG. 2 may include the "Brand X Website" language in the browser's title bar, the "Welcome to Brand X's Website" message, the Brand X logo, a static streamed welcome message played for all customers, and a list of current specials offered by Brand X to all customers. (E.g. Brand X Product 1 and Brand X Product 2).

Static content may be cached, meaning that a collection of frequently accessed data (here the static content) may be temporarily stored in a temporary storage area where frequently accessed data may be rapidly processed. This may be accomplished by collecting the data, computed at an earlier time, and duplicating and/or storing it with its original values in a different storage area. Reading cached data may bypass expensive-to-fetch original data, and so a cached copy may be accessed, rather than re-fetching or re-computing original data.

The cache may include one or more additional layers of cached content for the static component of the website content, which may include secondary or tertiary caching layers. These additional layers are not limited to a single machine or data center 380, and may be found within edge responders in regional distribution points of a content delivery network, described below.

As an example of such additional caching layers, a text caching layer may contain Brand X's welcome text, an image caching layer may contain Brand X's logo and a multimedia caching layer may contain the streaming multimedia welcome message. This multimedia streaming message also demonstrates that the static component of the website content may include streaming content.

Dynamic content may include website content that can change, in response to different contexts or conditions. Such contexts or conditions may include stored content retrieval and calculations or processes run on the stored content.

As non-limiting examples, query languages such as MSSQL or MySQL may be used to retrieve the content from a database and/or storage subsystem. Server-side scripting languages such as ASP, PHP, CGI/Perl, proprietary scripting software/modules/components etc. may be used to process the retrieved data. The retrieved data may be analyzed in order to determine the actions to be taken by the scripting language, such as determining whether and which dynamic information should be displayed.

Examples of dynamic content displayed on the interface in FIG. 2 may include the "Welcome John Q. Customer" language in the browser's title bar, information that shows that John Q. Customer is logged in, the "Welcome back to Brand X, John" language that recognizes a returning customer, and specific product suggestions based on John Q. Customer's previous purchases.

Figure 3:
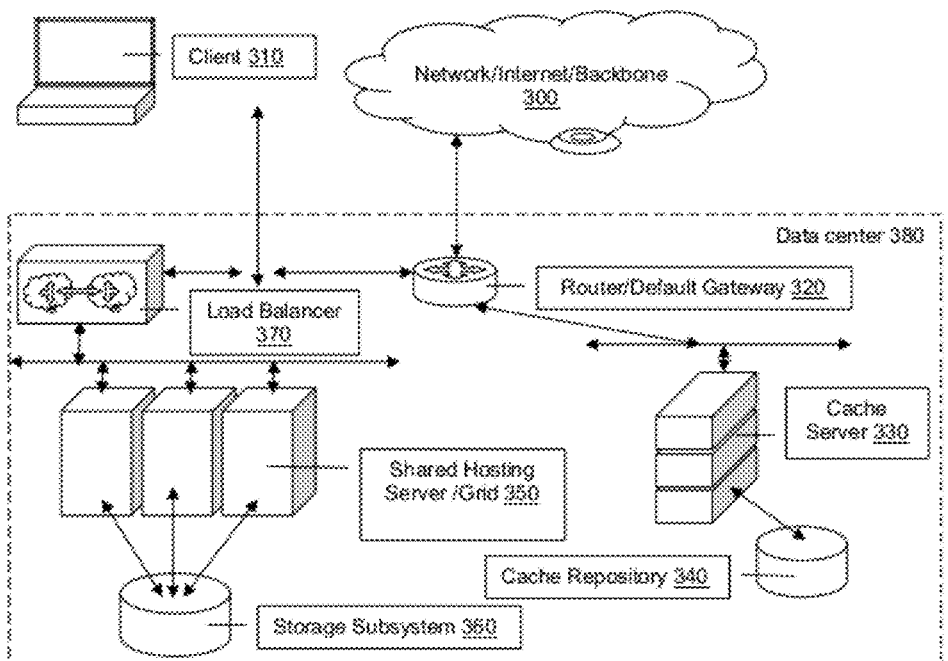
FIG. 3 illustrates a possible system in which static and dynamic content may be requested and delivered.

Several different environments may be used to accomplish the steps of embodiments disclosed herein. FIG. 3 demonstrates a streamlined example of such an environment. A client 310 may make a request over a network 300. A router 320 may route the request to a cache server 330 and/or a shared hosting server 350, either of which may be an individual server, part of a server cluster, part of a network cloud or part of a network grid. Likewise, either may be integrated as components within a single integrated web server as a cache server component and/or a shared hosting component described below. The cache server 330 may be communicatively coupled to a cache repository 340, and the shared hosting server may be communicatively coupled to a storage subsystem 360.

The example embodiments shown and described exist within the framework of a network 300 and should not limit possible network configuration or connectivity. Such a network may comprise any combination of the Internet, an intranet, an extranet, a local area network, a wide area network, a wired network, a wireless network, a telephone network, a corporate network backbone or any other known or later developed network.

A network backbone may interconnect various pieces of the network 300, providing a path for information exchange, either between different sub-networks in the same data center 380 or over a wide area. For example, a large corporation, such as Brand X in the disclosed examples, may have a backbone that connects and ties together server clusters or network locations in different corporate geographical areas.

The client 310 may be any computer or program that provides services to other computers, programs, or users either in the same computer or over a computer network 300. As non-limiting examples, the client 310 may be an application, communication, mail, database, proxy, fax, file, media, web, peer-to-peer, or standalone computer which may contain an operating system, a full file system, a plurality of other necessary utilities or applications or any combination thereof on the client 310. Non limiting example programming environments for client applications may include JavaScript/AJAX (client side automation), ASP, JSP, Ruby on Rails, Python's Django, PHP, HTML pages or rich media like Flash, Flex or Silverlight.

Client software may be used for authenticated remote access to a hosting computer or server. These may be, but are not limited to being accessed by a remote desktop program and/or a web browser, as are known in the art.

The router 320 may be any computer or network component whose software and hardware are tailored to the task of routing and forwarding information. The router 320 may also represent the default gateway for the backbone of the network 300. Non-limiting examples of routing resources which may be used in the framework of the disclosed environment may include routers, switches, hubs, gateways, access points, network interface cards, network bridges, modems, ISDN adapters, firewalls, datacenter equipment such as file servers, database servers and storage areas, network services such as DNS, DHCP, email and content delivery.

The receipt of the request for website content from the client 310 and identification of the data center 380 as closest in physical proximity to the client 310 may be accomplished by a router or any other network routing server computer communicatively coupled to a network 300. This may be applied to all embodiments, and may include all details of routing and server characteristics disclosed and described herein.

The cache server 330 and the shared hosting server 350 may be servers or may be used for applications and/or processes related to server functionality and may include any combination of known or later developed server technologies or formats capable of providing access to website content requested by a client 310. The cache server 330 may also have caching capabilities as described herein. In one embodiment, the shared hosting server 350 in the data center 380 is separate from the cache server 330. In other embodiments, the shared hosting server 350 and cache server 330 may be modified to be components of an integrated web server, and may be used together to accomplish the process steps described herein.

The server technologies or formats used may include, but are not limited to shared hosting, virtual dedicated hosting, dedicated hosting, or any combination thereof. The type of server should likewise not be limited, and may include a Web Hosting Server, a DNS Server, a Mail Server, other Servers now known or later developed in the art, or any combination thereof.

The shared hosting server 350 may include an account on a hosting service or virtual hosting service communicatively coupled to a network 300. Each account may sit on its own partition or section/place on the shared hosting server 350 to keep it separate from other accounts, or may be hosted on its own dedicated server. Just as the server may be any server known in the art, the account may likewise be any account associated with such a server. Thus, the account on the shared hosting server may be an account for a web hosting service (such as the Brand X ecommerce site example), an email account, a DNS administrator account, etc.

The cache server 330 and the shared hosting server 350 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer, which may be more cost effective than single computers of comparable speed or availability.

The shared hosting server 350 and/or any shared hosting component may have the characteristics of an "origin" server 350 or origin server component, meaning that it is upstream, or higher in the hierarchy of servers or server components within the network 300, based on the direction of resolution of the request or response.

The cache repository 340 and storage subsystem 360 may be any computer components, devices, and/or recording media that may retain digital data used for computing for some interval of time. The storage may be capable of retaining stored content for the dynamic component or the cached content for the static component of the requested website content respectively, on a single machine or in a cluster of computers over the network 300.

Embodiments exist wherein the cache repository 340 and/or storage subsystem 360 may exist in separate machines, in separate memory areas of the same machine such as different hard drives, or in separate partitions within the same hard drive, such as a database partition. Other embodiments include the cache repository 340 or the storage subsystem 360 being communicatively coupled to an integrated web server, but not local to that machine.

Non-limiting examples of the cache repository 340 and storage subsystem 360 may include a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof. The shared hosting server 350 may use this centralized storage to have access to a common pool of cached content within the cache server 330 or cache content component, which any of the shared hosting sites may draw content from.

A load balancer 370 may be used to distribute traffic among multiple resources in order to use bandwidth efficiently. Load balancing may be implemented to alternate or distribute traffic between multiple resources. A high load alert may be used as a metric that reflects a high amount of traffic utilizing a resource in a group of resources. The best configuration may then be reflected in the option with the lowest load or load distribution.

Figure 4:
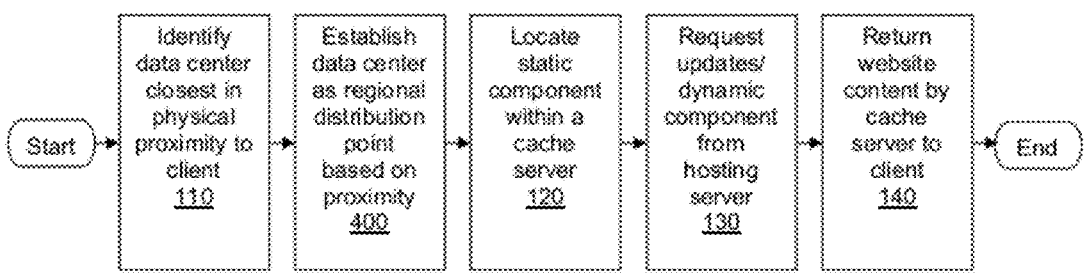
FIG. 4 is a flow diagram illustrating a possible embodiment of a method for delivering static and dynamic content.

FIG. 4 shows that the illustrated embodiment, as well as other disclosed embodiments, may include a step of establishing the data center 380 as a regional distribution point based on physical proximity to the client 310 (Step 400). To accomplish this, the cache server 330 or shared hosting server 350 may include an edge server component within a content delivery network.

A content delivery network (CDN) may be a system of computers and servers networked together across the Internet which work together transparently to move content closer to end users in the interest of improving performance and scalability. The cache server 330 and the shared hosting server 350 may include components which establish them as computers at the "edge" of the CDN nearest the client 310 requesting the website content.

This edge component within the cache server 330, the shared hosting server 350 and/or an integrated web server including a cache server component 330 and a shared hosting component 340 may be used to establish and confirm the data center 380 as being the closest regional data center 380 in physical proximity to the client 310. In addition to the edge server component, these servers or components may also be capable of responding to content requests using web server functionality.

The CDN may intercept the request for website content and all subsequent regional network traffic requests for content. By intercepting these initial and subsequent requests, the data center 380 may be identified as a regional aggregator for content for that region. As a non-limiting example, regional data centers may exist in Ashburn, Europe, Asia, etc. By intercepting the request for website content from a client 310 in Europe, the European localized edge server capabilities on the cache server 330 or shared hosting server 350 (or integrated components) in the data center 380 may establish the European data center 380 as the regional distribution point for all similar requests for that region of Europe.

Figure 5:
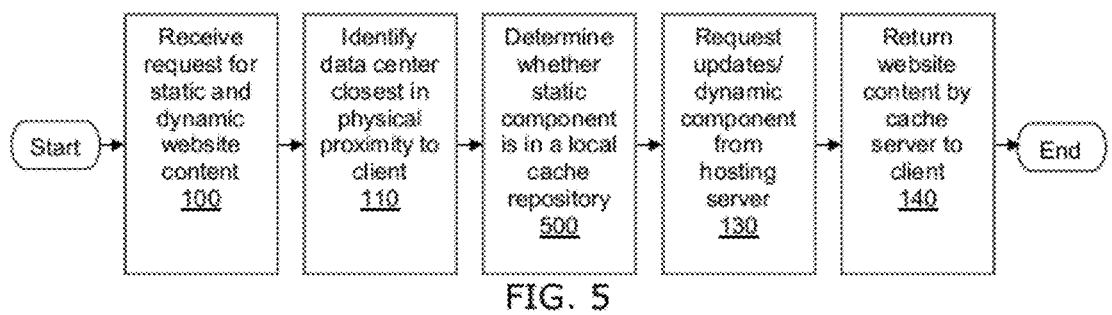
FIG. 5 is a flow diagram illustrating a possible embodiment of a method for delivering static and dynamic content.

FIG. 5 shows that the illustrated embodiment, as well as other disclosed embodiments, may include the step of determining, by the cache server 330, whether the static component is contained within a local cache repository 340 communicatively coupled to the cache server 330 (Step 500).

Figure 6:
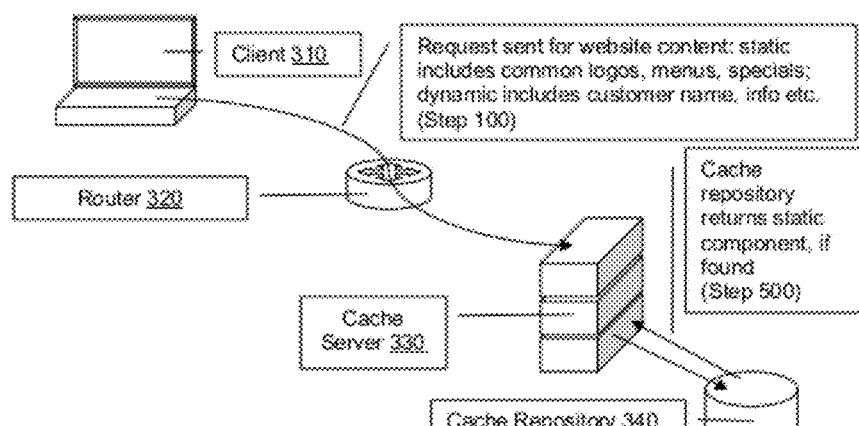
FIG. 6 illustrates a possible example system for delivering static and dynamic content.

FIG. 6 shows an example environment using the disclosed structure that may be used to determine whether the static component is contained within the cache repository 340 (Step 500). For example, the customer may attempt to access the static and dynamic content on the Brand X website using a browser on a client 310. The request for the website content may be sent through a router 320, and the request for general static content such as Brand X logos, menus, common specials, etc. may be sent to a cache server 330. The cache server 330 may then search the cache repository 340 for the requested static content. If found, the static content may be returned to the cache server 330.

Figure 7:
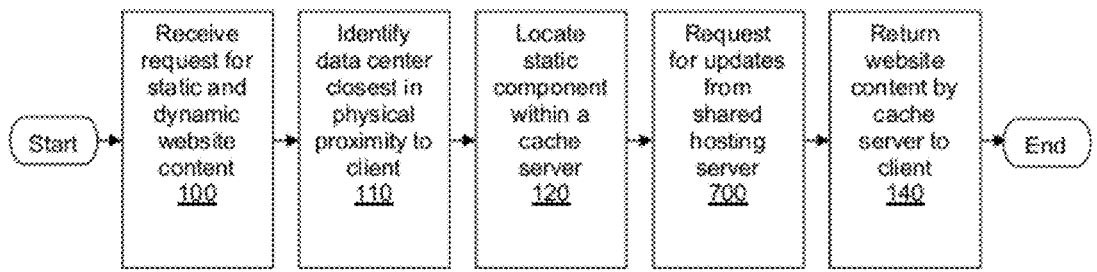
FIG. 7 is a flow diagram illustrating a possible embodiment of a method for delivering static and dynamic content.

FIG. 7 shows that the illustrated embodiment, as well as other disclosed embodiments, may include the step of requesting, by the cache server 330, updates to the static component, possibly via a header request, for a cacheable content from the origin server 350 (Step 700).

HTTP headers may be used as a part of, and may be central to the HTTP request for static content updates, and such headers may also be important to the corresponding HTTP response, as they may be used to define the various characteristics of the data that is requested or the data that has been provided. A header request may include the information requested from the shared hosting server 350 by the cache server 330, such as updates to the cached content in the cache repository 340.

Figure 8:
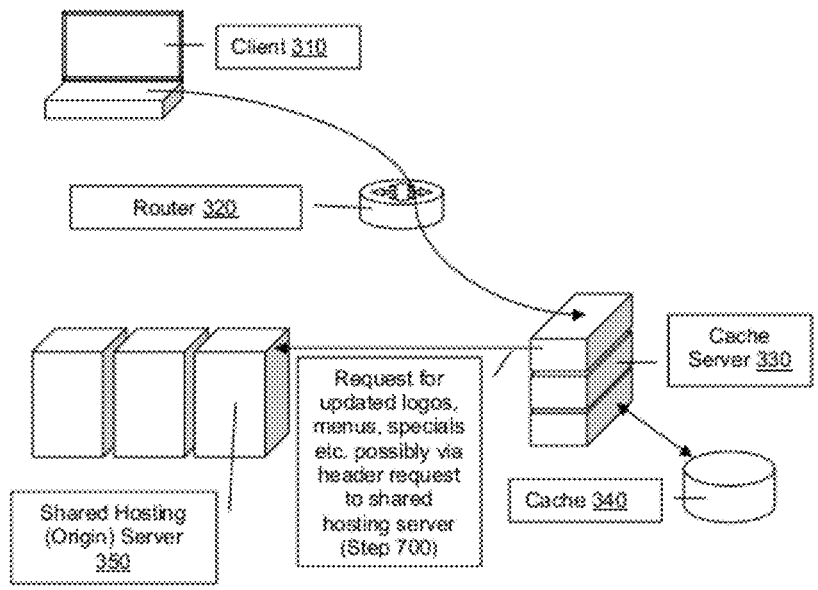
FIG. 8 illustrates a possible example system for delivering static and dynamic content.

FIG. 8 shows an example environment using the disclosed structure that may be used to request, by the cache server 330, updates to the static component, possibly via a header request, for a cacheable content from the origin server 350 (Step 700). For example, Brand X may have updated its logo, menus or general specials since they were last requested. To be sure the most recent version of this content is displayed to the customer, the cache server 330 may request updates from the shared hosting server 350, possibly via an HTTP header request. These header requests may define various characteristics of the data that is requested or the data provided.

Figure 9:
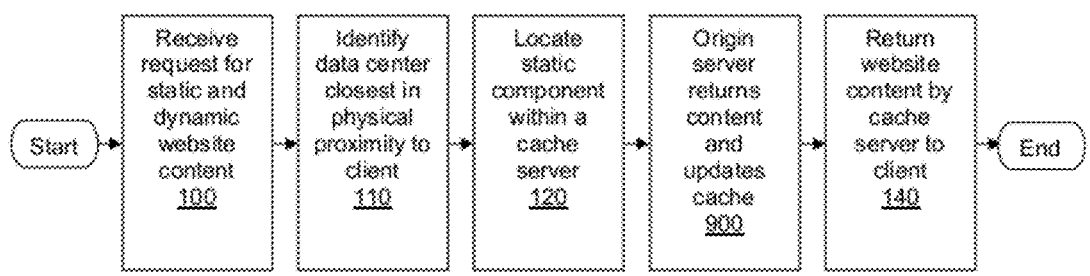
FIG. 9 is a flow diagram illustrating a possible embodiment of a method for delivering static and dynamic content.

FIG. 9 shows that the illustrated embodiment, as well as other disclosed embodiments, may include the steps of determining, by the origin server 350, updates required for the static component and updating the local cache repository 340 communicatively coupled to the cache server 330 with the cacheable content received from the origin server 350 (Step 900).

Figure 10:
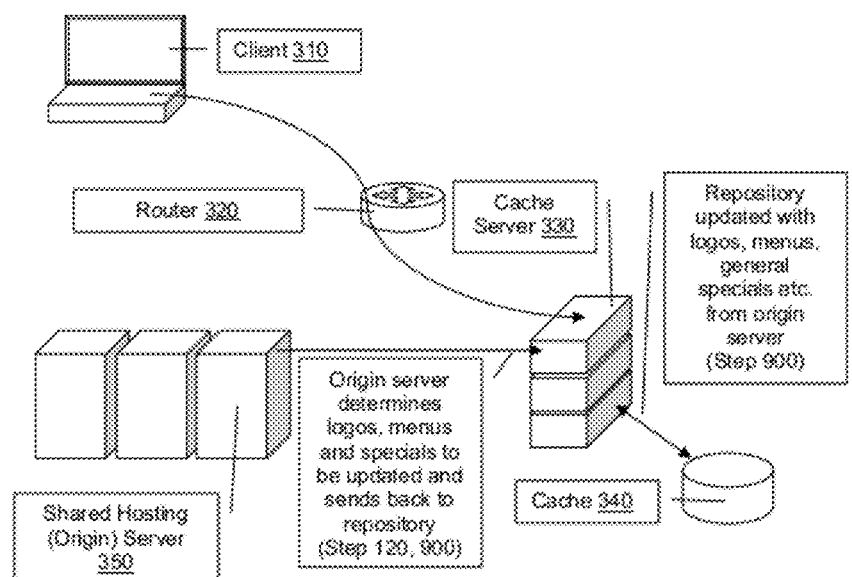
FIG. 10 illustrates a possible example system for delivering static and dynamic content.

FIG. 10 shows an example environment using the disclosed structure that may be used for the origin server 350 to determine updates required for the static component of the website content and update the local cache repository 340 (Step 900). For example, if Brand X's logo, menus or general specials have changed since they were last requested, the origin server 350 may determine file differences relating to date, size, ownership characteristics, image or data stream characteristics between the origin server 350 and the cache repository 340. If these differences are significant, the origin server 350 may calculate that the logos, menus or general specials need to be updated. These updated items may then be sent from the origin server 350 and stored in the cache repository 340. The origin server 350 and cache repository 330 may be used in a similar fashion to check and update expired or non-expired cached content.

Figure 11:
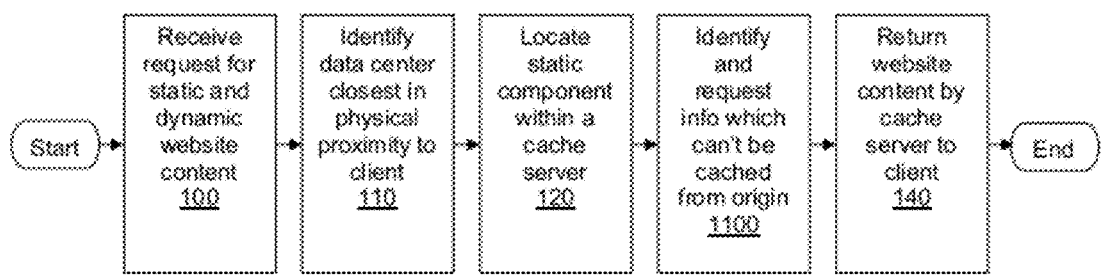
FIG. 11 is a flow diagram illustrating a possible embodiment of a method for delivering static and dynamic content.

FIG. 11 shows that the illustrated embodiment, as well as other disclosed embodiments, may include the step of determining and requesting a dynamic component, which may be identified as a portion of the website content which is incapable of being cached, to be fetched from the origin server (Step 1100). Such a request may be made by the cache server 330 or by the client 310.

Figure 12:
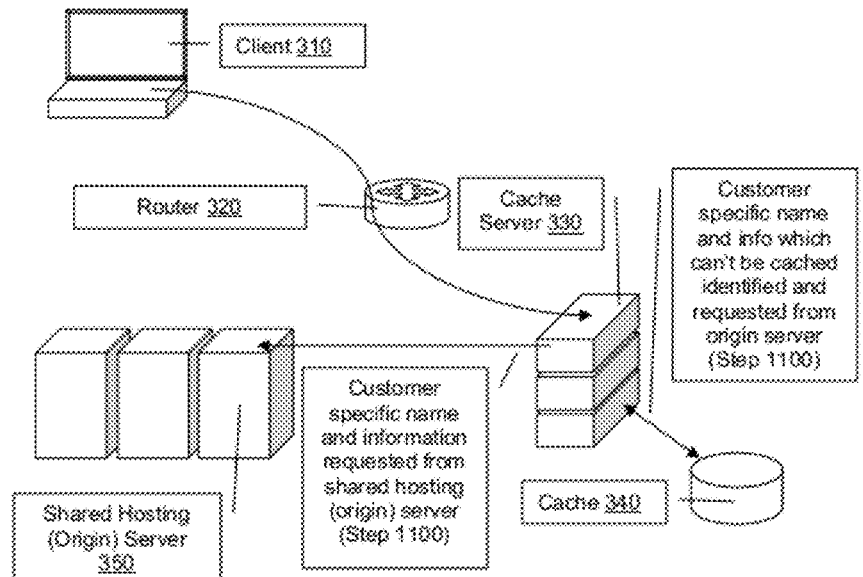
FIG. 12 illustrates a possible example system for delivering static and dynamic content.

FIG. 12 shows an example environment using the disclosed structure that may be used to determine and request dynamic content to be fetched from the origin server, which may not be cached (Step 1100). For example, the customer's name and information, such as personalized shopping behavior, may be different each time the website content is requested. This unique and specific information, which may not be cached, may be needed for the Brand X website page displayed to the customer. The cache server 330, or the client 310 in other embodiments, may request this information from the origin server 350.

Figure 13:
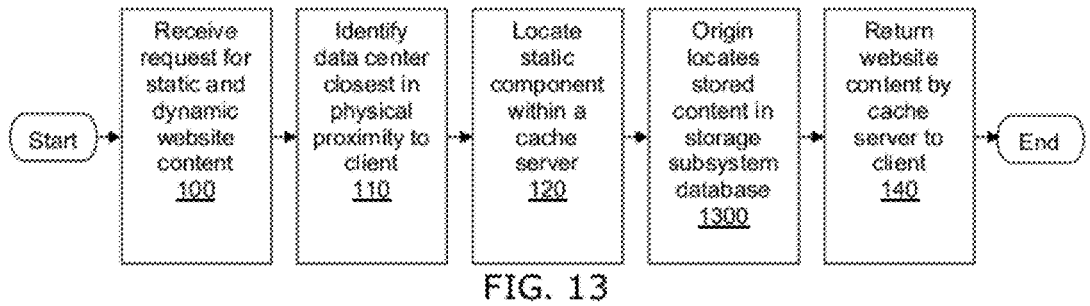
FIG. 13 is a flow diagram illustrating a possible embodiment of a method for delivering static and dynamic content.

FIG. 13 shows that the illustrated embodiment, as well as other disclosed embodiments, may include the step of performing, by the origin server 350, a database lookup (or locating content in a database) for a stored content used in the dynamic component, wherein the stored content is located in a storage subsystem 360 communicatively coupled to the origin server 350 (Step 1300).

Figure 14:
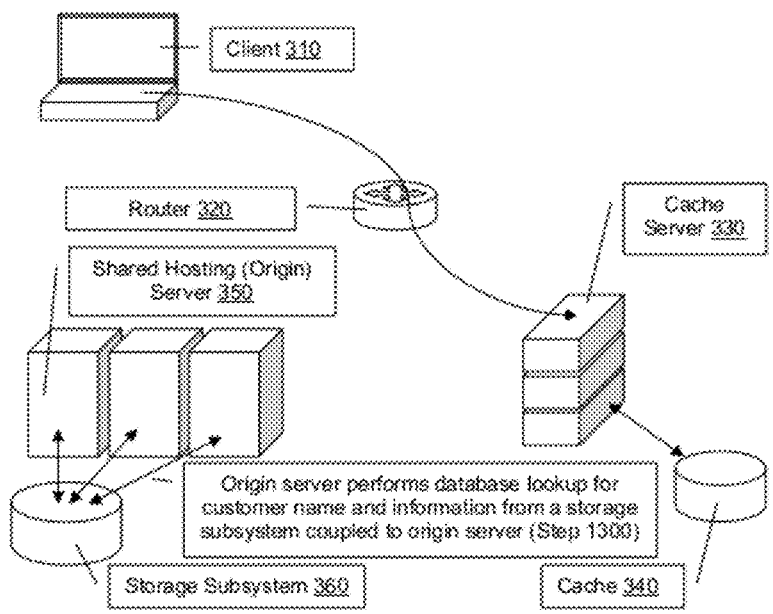
FIG. 14 illustrates a possible example system for delivering static and dynamic content.

FIG. 14 shows an example environment using the disclosed structure that may be used to perform a database lookup for stored content in a storage subsystem 360 communicatively coupled to the origin server 350 (Step 1300). For example, the requested customer's name and information such as personalized shopping behavior may be fetched by performing a database lookup in and from the storage subsystem 360 coupled to the origin server 350.

Figure 15:
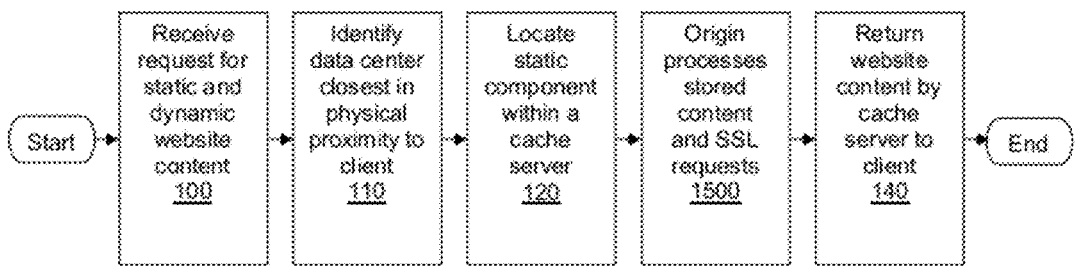
FIG. 15 is a flow diagram illustrating a possible embodiment of a method for delivering static and dynamic content.

FIG. 15 shows that the illustrated embodiment, as well as other disclosed embodiments, may include the step of processing, by the origin server 350, the stored content wherein processing is determined by the stored content from the storage subsystem 360. This step may also include processing of any SSL processes requested (Step 1500). Such requests may come from the cache server 330 or from the client 310.

SSL processes may include processes or a protocol for transmitting private documents via the Internet by using a private key to encrypt data transferred over an SSL connection. An SSL certificate on a website lets customers know that the owner of the website has been verified by a trusted third party (Certificate Authority or CA) and that confidential communications with the website are encrypted.

The certificate (such as an X.509 certificate) typically includes an identification of the server (such as its hostname), the server's public key, and a digital signature provided by the well known CA. The digital signature is used by a client receiving the certificate from a server to authenticate the identity of the server before initiating a secured session. Common conventional browsers, such as NETSCAPE NAVIGATOR and INTERNET EXPLORER, support the SSL protocol, and many Web sites use the protocol to obtain confidential user information from their Customers. By convention, Uniform Resource Locators (URLs) that require an SSL connection start with "https" instead of "http."

Figure 16:
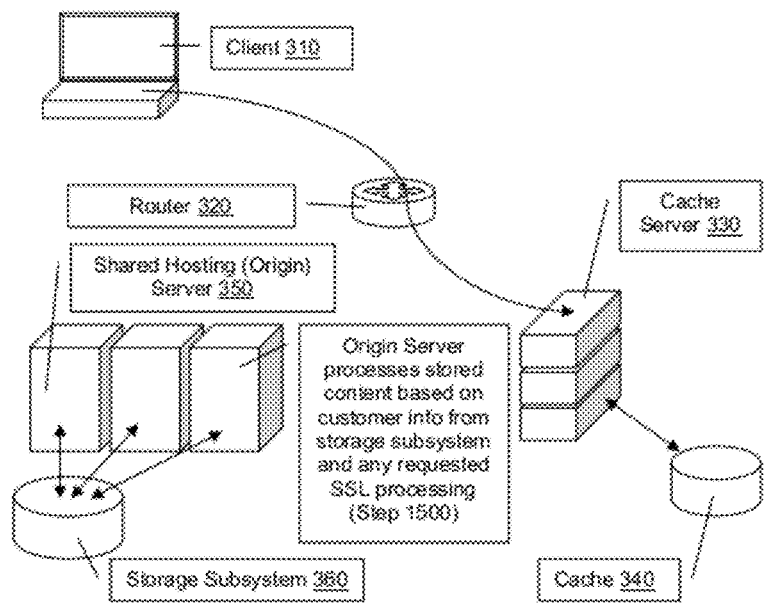
FIG. 16 illustrates a possible example system for delivering static and dynamic content.

FIG. 16 shows an example environment using the disclosed structure that may be used to process the stored content from the storage subsystem 360 and any SSL processes requested (Step 1500). For example, the requested customer's name and information may be processed to determine patterns in the customer's shopping behavior. These determinations may be made based on previous purchases from the Brand X website. Using the information from these purchases, product suggestions, such as those seen in FIG. 2 may be presented to the customer on the displayed Brand X web page. Such processing may be accomplished using means described herein regarding server-side scripting. Additionally, if SSL certificates were used for security in purchasing such products, a request for SSL processing may be made and executed by the shared hosting server 350.

Figure 17:
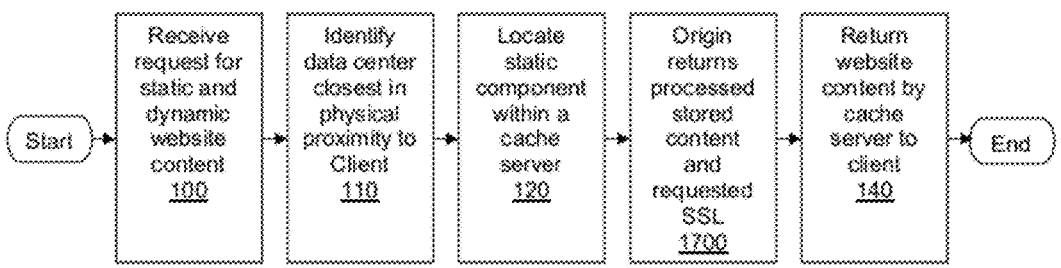
FIG. 17 is a flow diagram illustrating a possible embodiment of a method for delivering static and dynamic content.

FIG. 17 shows that the illustrated embodiment, as well as other disclosed embodiments, may include the step of returning the dynamic component to the cache server 330 after processing the stored content (Step 1700). Other embodiments may allow for the dynamic component to be returned to the client 310 after processing of the stored content.

Figure 18:
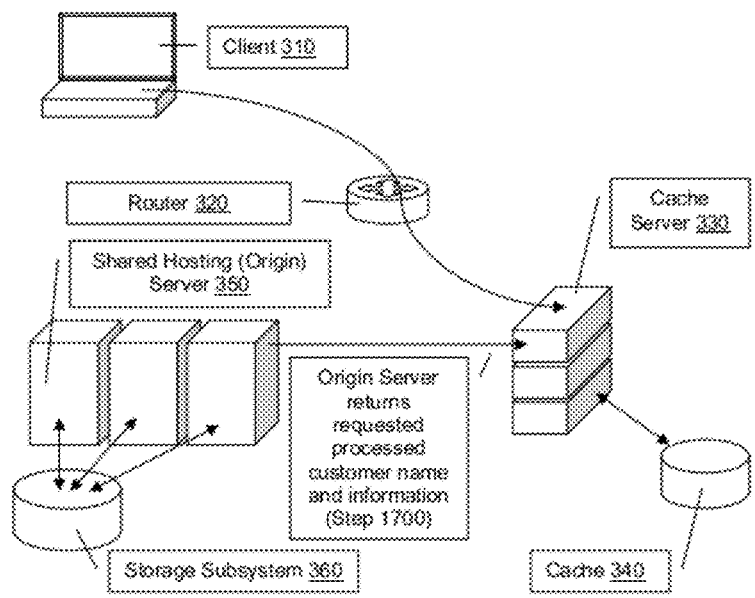
FIG. 18 illustrates a possible example system for delivering static and dynamic content.

FIG. 18 shows an example environment using the disclosed structure that may be used to return the dynamic component to the cache server 330 after processing the stored content (Step 1700). For example, once the customer's name and information have been retrieved and processed and any SSL processing is complete, the information may be returned to the cache server 330 by the origin server 350. The cache server 330 may contain a web server component, according to the server properties disclosed elsewhere in this application, which allows the cache server 330 to return the website content, including the combination of static and dynamic components to the client 310 (Step 140). Such content or processing may also be returned to the client 310 directly from the origin server in other embodiments.

The additional steps included in the embodiments illustrated in FIGS. 1-18 are not limited to the embodiment shown in FIG. 1 and may be combined in several different orders and modified within multiple other embodiments.

As a non-limiting example, a request for static and dynamic website content may be made by a client 310 (Step 100), and the data center 380 in closest proximity to the client 310 may be identified (Step 110). The proximity of the client 310 to the data center 380 may then be used to establish the data center 380 as a regional distribution point for that client 310 (Step 400), and the static component of the website content may be located within a cache server 330 in the data center 380 (Step 120). The cache server 330 may determine whether the static component is in a local cache repository 340 (Step 500), and if not, or the cached content is expired, may request updates to the static component from the shared hosting server 350 (Step 700), which may return the updated static content and update the cache repository 340 (Step 900).

Information which is determined incapable of being cached may be requested from the shared hosting server, which may also be an origin server 350 (Step 1100) and the origin server 350 may perform a database lookup from a storage subsystem 360 attached to the origin server 350 (Step 1300). The stored content returned by the storage subsystem 360 may be used to process the stored content, along with any SSL processing, which may have been requested by the cache server 330 (Step 1500). The processed stored content and SSL may be returned to the cache server 330 (Step 1700), and the combined static and dynamic components may be returned to the client 310 by the cache server 330 as the requested website content (Step 140).

A Method of URL-Rewritten Static and Dynamic Content Delivery

Several different methods may be used to provide and manage the disclosed invention. In an example embodiment illustrated in FIG. 19, a request may be received, from a client 310, for a website content including a static and dynamic website content (Step 100) and a data center 380 may be identified as being closest in physical proximity to the client 310 as compared to a plurality of data center 380s communicatively coupled to a network 300 (Step 110). A request may be made by the client 310, to a shared hosting server 350 within the data center 380, for the dynamic component of the website content and a rewritten URL for requesting the static component of the website content (Step 1900). The static component may be located within a cache server 330 using the rewritten URL, and the cache server 330 may request, from the shared hosting server 350, updates to the static component (Step 1910). When the website content, including the static and dynamic components are combined and/or assembled, the website content may be returned to the client 310 by the cache server 330 (Step 140).

Figure 20:
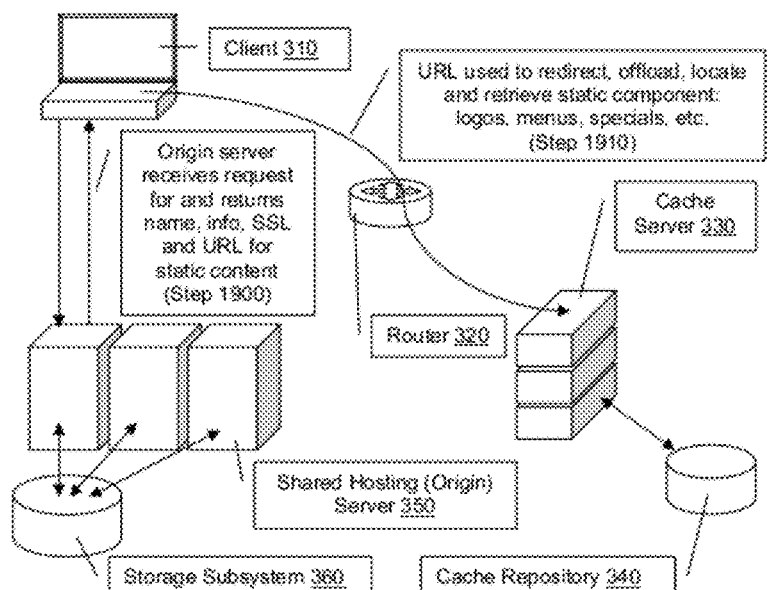
FIG. 20 illustrates a possible example system for delivering static and dynamic content.

FIG. 20 shows an example environment using the disclosed structure that may be used to request, by the client 310, the dynamic component and a rewritten URL for requesting the static component from a shared hosting server 350 in the data center 380 (Step 1900) locating, using the rewritten URL, the static component within a cache server 330 in the data center 380 and requesting, by the cache server 330, an update to the static component from the shared hosting server 350 (Step 1910).

For example, the requested customer's name and information such as personalized shopping behavior may be fetched by performing a database lookup in and from the storage subsystem 360 that is coupled to the origin server 350. Any SSL processing may also be performed, if requested by the client 310 (Step 1900). The customer's name and information, as well as the URL used to redirect, offload, locate and retrieve static information, such as general Brand X logos, menus, specials, etc. may be returned to the client 310 (Step 1910).

Figure 19:
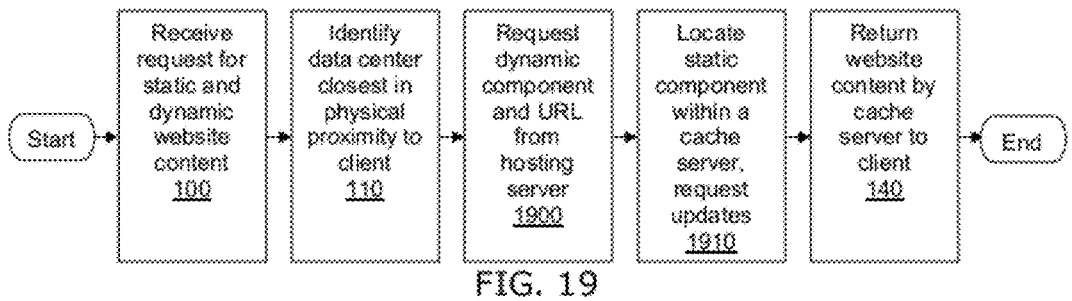
FIG. 19 is a flow diagram illustrating a possible embodiment of a method for delivering static and dynamic content.

In the interest of simplicity for example purposes, the additional steps included in the embodiments illustrated in FIGS. 1-18, and disclosed in detail elsewhere in this specification may be applied to the example embodiment and environment shown in FIGS. 19-20, and may be combined in several different orders and modified within multiple other embodiments.

As a non-limiting example, a request for dynamic and static website content may be made by a client 310 (Step 100), and the data center 380 in closest proximity to the client 310 may be identified (Step 110). The proximity of the client 310 to the data center 380 may then be used to establish the data center 380 as a regional distribution point for that client 310 (Step 400), and information which is determined incapable of being cached, as well as a rewritten URL for requesting the static component may be requested by the client 310 from the shared hosting server 350 (Step 1900). Any requested SSL processing may also be requested, processed and returned. The shared hosting server 350 may be an origin server, which may perform a database lookup from an attached storage subsystem 360 (Step 1300). The stored content returned by the storage subsystem 360 may be used to process the stored content (Step 1500).

The requested URL may be used to locate the static component of the website content, located within a cache server 330 in the data center 380 (Step 1910). The cache server 330 may determine whether the static component is in a local cache repository 340 (Step 500), and if not, may request updates to the static component from the origin server 350 (Step 700). The origin server 350 may return the updated static content and update the cache repository 340 (Step 900), and the combined static and dynamic components may be returned to the client 310 as the requested website content (Step 140).

The rewritten URL may comprise the process of making a web page available under many URLs. This may be accomplished by server-side or client-side redirection, possibly using URL redirection services (an information management system, which provides an internet link that redirects users to the desired content), a manual redirect, HTTP refresh header, a refresh meta tag (which instructs the web browser to automatically refresh the current web page after a given time interval), using an HTML meta element, change to a status code or customized HTTP headers added to a script (using such languages as ASP, PHP or JavaScript), frame redirects, redirect loops, any other means of redirection now known or later developed in the art, or any combination thereof.

Redirection may induce the browser to go to another location. This may include the URL of the redirect target to be given in the "Location: header" of the HTTP response. The location header may contain a different URL or URI. For example, in ASP, a user may use a response.redirect command or in PHP, a header ("Location: http://www.example.com"); command may be used. The HTTP header redirects may also include a direct link to the destination. In the Brand X example, such a link may appear as www.brandx.cdn.com. The server may rewrite the URL for static content to hit the CDN. This would allow for the possibility that FTP transactions may remain unchanged.

In the context of the example interface shown in FIG. 2, a customer may attempt to access the dynamic and static content on the Brand X website using a client browser (Step 100). The information specific to the customer which could not be cached, such as a personalized greeting and previous purchases made may be requested from a shared hosting server 350, which may also be an origin server (Step 1900).

The origin server 350 may request the personalized greeting and previous purchase information from a storage subsystem 340 (Step 1300) and based on the previous purchase information, may process the information to determine product suggestions for the customer (Step 1500). SSL processing may also be done for purchases made by the customer, and the dynamic component, along with a rewritten URL to redirect and locate the static component may be returned to the customer's client 310. This rewritten URL may allow the shared hosting server 350 to offload delivery of static content by redirecting to the client 310 and from the client 310 to the cache server 330.

The rewritten and returned URL may be used to redirect to and locate the static component within the cache server 330 including common logos, Brand X generic references, or specials common to all customers, etc. (Step 1910). Generic welcome multimedia messages may be contained in a secondary and/or tertiary level of caching or in different regional distribution points (Step 500). The cache server 330 may send a request to the origin server 350 to find out if a new logo, message, special, etc. has been added to the content (Step 700), and if so, this content may be returned and updated in the cache repository 340 (Step 900). The completed website content including the content displayed in FIG. 2 may then be returned to the client 310 (Step 140).

A Method of Integrated Static and Dynamic Content Delivery

Several different methods may be used to provide and manage the disclosed invention. In an example embodiment illustrated in FIG. 21, a request may be received, from a client 310, for a website content including a static component and a dynamic component (Step 100), and a data center 380 may be identified as being closest in physical proximity to the client 310 as compared to a plurality of data center 380s communicatively coupled to a network 300 (Step 110). The static component of the website content may be located within a cache server component 2210 in an integrated server in the data center 380 (Step 2100), and the cache server component 2210 may request updates to the static component, the dynamic component, or SSL certificate processing from a shared hosting component 2200 within the integrated server in the data center 380 (Step 2110). When the website content, including the static and dynamic components are combined and/or assembled, the website content may be returned to the client 310 by the cache server component 2210 (Step 140).

Figure 22:
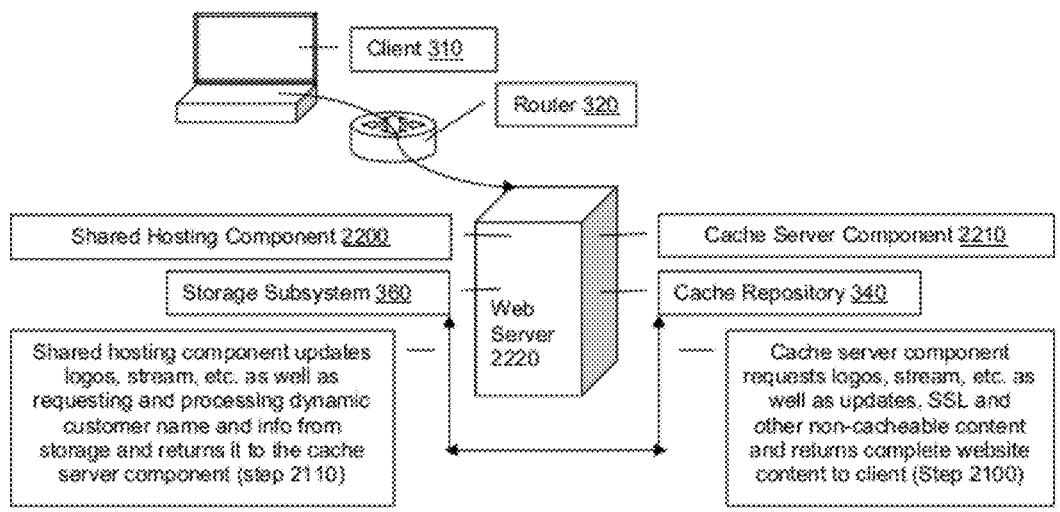
FIG. 22 illustrates a possible example system for delivering static and dynamic content.

FIG. 22 shows an example environment using the disclosed structure that may be used to locate the static component within a cache server component of an integrated web server 2220 in the data center 380, wherein the integrated web server 2220 comprises a cache server component 2210 and a shared hosting component 2200 (Step 2100), and requesting, by the cache server component 2210, the dynamic component and an update to the static component from the shared hosting component 2200 (Step 2110).

The components in this and other similar embodiments may have any of the characteristics of the counterpart elements in other disclosed embodiments, and these elements may be integrated within a single integrated server. For example, the cache server component 2210 and the shared hosting component 2200 may have the same characteristics of the cache server 330 and shared hosting server 350 respectively. The shared hosting component 2200 may also act as an origin server similar to the capabilities of the shared hosting server 350. The server on which these components reside may further be used as a localized edge server. This may allow for pseudo-scaling individual hosting servers within the CDN. The cache repository 340 may or may not be a local but separate disk. The storage subsystem 360 may also be integrated into or separate from the server.

Figure 21:
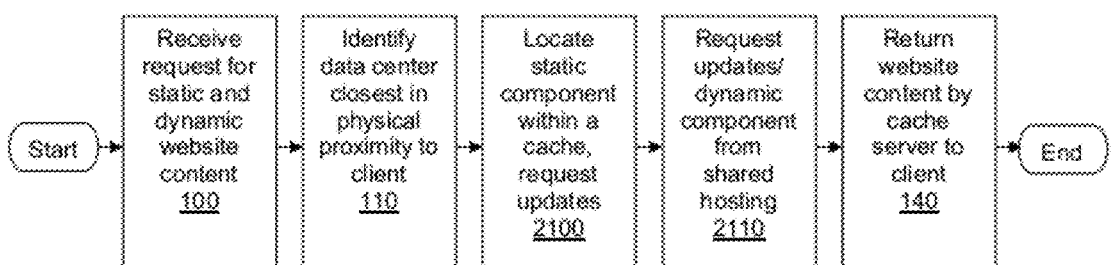
FIG. 21 is a flow diagram illustrating a possible embodiment of a method for delivering static and dynamic content.

In the interest of simplicity for example purposes, the additional steps included in the embodiments illustrated in FIGS. 1-18, and disclosed in detail elsewhere in this specification may be applied to the example embodiment and environment shown in FIGS. 21-22, and may be combined in several different orders and modified within multiple other embodiments.

As a non-limiting example, a request for static and dynamic website content may be made by a client 310 (Step 100), and the data center 380 in closest proximity to the client 310 may be identified (Step 110). The proximity of the client 310 to the data center 380 may then be used to establish the data center 380 as a regional distribution point for that client 310 (Step 400), and the static component of the website content may be located within a cache server component 2210 within the integrated server in the data center 380 (Step 120). The cache server component 2210 may determine whether the static component is in a local cache repository 340 (Step 500), and if not, or the cached content is expired, may request updates to the static component from the shared hosting component 2200 (Step 1900), which may return the updated static content and update the cache repository 340 (Step 900).

Information which is determined incapable of being cached may be requested from the shared hosting component 2200, which may also have or be communicatively coupled to an origin server component 350 (Step 1100) and the origin server component 350 may perform a database lookup from a storage subsystem 360 within the integrated server or attached to the origin server component 350 (Step 1300). The stored content returned by the storage subsystem 360 may be used to process the stored content, along with any SSL processing, which may have been requested by the cache server component 2210 (Step 1500). The processed stored content and SSL may be returned to the cache server component 2210 (Step 2110), and the combined static and dynamic components may be returned to the client 310 by the cache server component 2210 as the requested website content (Step 140).

In the context of the example interface shown in FIG. 2, a customer may attempt to access the static and dynamic content on the Brand X website using a client browser (Step 100). The cache server component 2210 may locate the static component including common logos, Brand X generic references, or specials common to all customers, etc. (Step 2100).

Generic welcome multimedia messages may be contained in a secondary and/or tertiary level of caching or in different regional distribution points (Step 500).

The cache server component 2210 may send a request to the shared hosting component 2200, which may also have the characteristics of an origin server to find out if a new logo, message, special, etc. has been added to the content (Step 700), and if so, this content may be returned and updated in the cache repository 340 (Step 900).

The information specific to the customer which could not be cached, such as personalized greeting messages and previous purchases made may be requested from the shared hosting component 2200 (Step 1900). The origin server component 350 may request the personalized greeting messages and previous purchase information from a storage subsystem 360 (Step 1300) and based on the previous purchase information, may process the information to determine product suggestions for the customer (Step 1500). SSL processing may also be done for purchases made by the customer, and the dynamic component may be returned to the cache server component 2110. The completed website content including the content displayed in FIG. 2 may then be returned to the client 310 (Step 140).

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising the steps of:
   a) receiving, by a first server computer communicatively coupled to a network, a request for a website content, said request being received from a user via a client computer;
   b) accessing, by said first server computer, a static component of said website content;
   c) requesting, by said first server computer, a dynamic component of said website content from a second server computer communicatively coupled to said network;
   d) requesting, by said second server computer, a personalized information for said user from a database communicatively coupled to said network;
   e) generating, by said second server computer, said dynamic component, wherein said dynamic component comprises one or more of said personalized information;
   f) transmitting, by said second server computer, said dynamic component to said first server computer; and
   g) transmitting, by said first server computer, said website content to said client computer, said website content comprising said static component and said dynamic component.

2. The method of claim 1, wherein said first server computer comprises a cache server and said second server computer comprises an origin server.

3. The method of claim 2, wherein said accessing step b) comprises accessing said static component stored in said cache server.

4. The method of claim 2, wherein said accessing step b) further comprises determining whether a first static component stored in said cache server is current and, responsive to a determination that said first static component is current, determining that said static component consists of said first static component.

5. The method of claim 2, wherein said accessing step b) further comprises, determining whether a first static component stored in said cache server is current and, responsive to a determination that said first static component is not current:
   i) requesting and receiving an updated static component from said origin server; and
   ii) defining said static component as said updated static component.

6. The method of claim 1, wherein said generating step e) comprises determining which of said personalized information to include in said dynamic content by using a scripting language running processes and calculations on said personalized information.

7. The method of claim 1, wherein said personalized information is determined from a login or behavior patterns, stored in said database, for said user.

8. A system, comprising:
   a) a first server computer communicatively coupled to a network and configured to:
      i) receive a request for a website content from a user via a client computer communicatively coupled to said network;
      ii) access a static component of said website content;
      iii) request a dynamic component of said website content from a second server computer communicatively coupled to said network; and
      iv) transmit said website content to said client computer, said website content comprising said static component and said dynamic component; and
   b) said second server computer comprising a database storing a personalized information for a user, said second server computer and said database being communicatively coupled to a network and said second server computer being configured to:
      i) request said personalized information for said user from said database;
      ii) generate said dynamic component, wherein said dynamic component comprises one or more of said personalized information; and
      iii) transmit said dynamic component to said first server computer.

9. The system of claim 8, wherein said first server computer comprises a cache server and said second server computer comprises an origin server.

10. The system of claim 9, wherein said first server computer is further configured to access said static component stored in said cache server.

11. The system of claim 9, wherein said first server computer is further configured to determine whether a first static component stored in said cache server is current and, responsive to a determination that said first static component is current, determine that said static component consists of said first static component.

12. The system of claim 9, wherein said first server computer is further configured to determine whether a first static component stored in said cache server is current and, responsive to a determination that said first static component is not current:
   i) request and receive an updated static component from said origin server; and
   ii) define said static component as said updated static component.

13. The system of claim 8, wherein said second server computer is further configured to determine which of said personalized information to include in said dynamic content by using a scripting language running processes and calculations on said personalized information.

14. The system of claim 8, wherein said personalized information is determined from a login or behavior patterns, stored in said database, for said user.

15. A method, comprising the steps of:
   a) receiving, by a second server computer communicatively coupled to a network, a request for a website content, said request being received from a user via a client computer;
   b) requesting, by said second server computer, at least one personalized information for said user from a database communicatively coupled to said network;
   c) generating, by said second server computer, a dynamic component of said website content, said dynamic component comprising one or more of said at least one personalized information;
   d) identifying, by said second server computer responsive to receiving said request for said website content, a uniform resource locator for a first server computer communicatively coupled to said network and storing a static component of said website content;
   e) transmitting, by said second server computer, said dynamic component and said uniform resource locator to said client computer;
   f) receiving from said client computer, by said first server computer, a request for said static component, said request for said static component being addressed to said uniform resource locator;
   g) accessing, by said first server computer, said static component of said website content; and
   h) transmitting, by said first server computer, said static component to said client computer.

16. The method of claim 15, wherein said first server computer comprises a cache server and said second server computer comprises an origin server.

17. The method of claim 16, wherein said accessing step g) comprises accessing said static component stored in said cache server.

18. The method of claim 16, wherein said accessing step g) further comprises determining whether a first static component stored in said cache server is current and, responsive to a determination that said first static component is current, determining that said static component consists of said first static component.

19. The method of claim 16, wherein said accessing step g) further comprises, determining whether a first static component stored in said cache server is current and, responsive to a determination that said first static component is not current:
   i) requesting and receiving an updated static component from said origin server; and
   ii) defining said static component as said updated static component.

20. The method of claim 15, wherein said generating step c) comprises determining which of said personalized information to include in said dynamic content by using a scripting language running processes and calculations on said personalized information.

21. The method of claim 15, wherein said personalized information is determined from a login or behavior patterns, stored in said database, for said user.

22. A system, comprising:
   a) a second server computer comprising a database storing at least one personalized information for a user, said second server computer and said database being communicatively coupled to a network and said second server computer being configured to:
      i) receive a request for a website content, said request being received from said user via a client computer;
      ii) request one or more of said at least one personalized information for said user from said database;
      iii) generate a dynamic component of said website content, wherein said dynamic component comprises one or more of said personalized information; and
      iv) identify, responsive to said request for said website content, a uniform resource locator for a first server computer communicatively coupled to said network and storing a static component of said website content; and
      v) transmit said dynamic component and said uniform resource locator to said client computer; and
   b) said first server computer configured to:
      i) receive a request for said static component from said client computer, said request being addressed to said uniform resource locator;
      ii) access said static component; and
      iii) transmit said static component to said client computer.

23. The system of claim 22, wherein said first server computer comprises a cache server and said second server computer comprises an origin server.

24. The system of claim 23, wherein said first server computer is further configured to access said static component stored in said cache server.

25. The system of claim 23, wherein said first server computer is further configured to determine whether a first static component stored in said cache server is current and, responsive to a determination that said first static component is current, determine that said static component consists of said first static component.

26. The system of claim 23, wherein said first server computer is further configured to determine whether a first static component stored in said cache server is current and, responsive to a determination that said first static component is not current:
   i) request and receive an updated static component from said origin server; and
   ii) define said static component as said updated static component.

27. The system of claim 22, wherein said second server computer is further configured to determine which of said at least one personalized information to include in said dynamic content by using a scripting language running processes and calculations on said at least one personalized information.

28. The system of claim 22, wherein said at least one personalized information is determined from a login or behavior patterns, stored in said database, for said user.

* * * * *